(12) United States Patent
Liu (10) Patent No.: US 11,074,029 B2
(45) Date of Patent: Jul. 27, 2021

(54) VALUE-ADDED REMOTE DISPLAY SERVICE WIRELESS ROUTING SERVER DEVICE AND METHOD

(71) Applicant: Magic Control Technology Corporation, New Taipei (TW)

(72) Inventor: Pei-Chung Liu, New Taipei (TW)

(73) Assignee: Magic Control Technology Corporation, New Taipei (TW)

( * ) Notice: Subject to any disclaimer, the term of this patent is extended or adjusted under 35 U.S.C. 154(b) by 0 days.

(21) Appl. No.: 16/285,429

(22) Filed: Feb. 26, 2019

(65) Prior Publication Data

US 2020/0026483 A1  Jan. 23, 2020

(51) Int. Cl.
 *G06F 3/14* (2006.01)
 *H04N 21/41* (2011.01)

(52) U.S. Cl.
 CPC .......... *G06F 3/1454* (2013.01); *G06F 3/1446* (2013.01); *H04N 21/4122* (2013.01)

(58) Field of Classification Search
 CPC .. G06F 3/1454; G06F 3/1446; H04N 21/4122
 See application file for complete search history.

(56) References Cited

U.S. PATENT DOCUMENTS

| 2009/0295977 A1* | 12/2009 | Sato | G09G 5/395 348/333.12 |
| 2013/0097516 A1* | 4/2013 | Hong | H04L 67/306 715/739 |
| 2019/0037173 A1* | 1/2019 | Lee | G06F 3/04817 |

\* cited by examiner

*Primary Examiner* — Towfiq Elahi
(74) *Attorney, Agent, or Firm* — Rosenberg, Klein & Lee (57) ABSTRACT

A value-added remote display service wireless routing server device includes one or more user-end image medium transmission electronic devices, a value-added routing server, a destination-end image medium display device and an actuation device connected to each user-end image medium transmission electronic device and having actuateable operation buttons. Each user-end image medium transmission electronic device transmits image data through a wired or wireless local area network to the value-added routing server, which, based on network band width and data processing capability, presets magnification/reduction resolution and designated displaying location to the image data transmitted from each user-end image medium transmission electronic device and transmits corresponding image display screen data to the destination-end image medium display device for displaying. The actuation device is operable through the actuateable operation buttons to have the user-end image medium transmission electronic device to provide a request for image magnification and location adjustment to the value-added routing server.

29 Claims, 6 Drawing Sheets

VALUE-ADDED REMOTE DISPLAY SERVICE WIRELESS ROUTING SERVER DEVICE AND METHOD

CROSS REFERENCE TO RELATED PATENT APPLICATION

This application claims priority to Republic of China Patent Application No. 107125250 filed on 20 Jul. 2018 and entitled "VALUE-ADDED REMOTE DISPLAY SERVICE WIRELESS ROUTING SERVER DEVICE AND METHOD," which is incorporated herein by reference in its entirety.

BACKGROUND OF THE INVENTION

1. Field of the Invention

The present invention relate to a value-added remote display service wireless routing server device and method, and more particularly to a device, as well as a method, which comprises at least one value-added routing server to receive and arrange at least one compressed image data and displayed image transmitted from one or more user-end medium transmission electronic device to be transmitted by the value-added routing server to at least one destination-end image medium display device for displaying.

2. The Related Arts

Multimedia advertisement image medium real time transmission and display are necessary functionality and requirement for the current network telecommunication technique environment, for example, commercial advertisement, including commercial transaction advertisement catalogs, food ordering catalog, product information wall, and job-hunting bulletin board, or medium briefing, in order to have the advisement information and briefing contents to be quickly transmitted, read, and responded. However, under the current condition that the network band width and resources are limited, when a number of users transmit high resolution images having great data contents to a remote server or a cloud server for displaying the image medium contents one by one, inevitable consumption of a relatively wide band by the excessively large image data contents would causes the network transmission speed slowed down or the performance worsened. Particularly, during the process when multiple users of the same local area network (LAN) or wireless local area network (WLAN) simultaneously transmit at least one image medium, severe insufficiency of network band width and delay of the transmission would occur, requiring upgrading of network server facility to more expensive one or increasing cloud server and network band width resources, and this would requires an increased installation cost, making it not economic.

Prior art patent documents are known, such as U.S. Pat. No. 8,756,348, which provides "electronic tool and methods for meeting" that provide a medium display tool and technology for multiple-user meetings that discloses "an electronic meeting tool for communicating arbitrary media content from users at a meeting comprising: a node configuration arranged to operate a display node (36) of a communications network, the display node (36) being coupled to a first display (44), the node configuration further being arranged to receive user selected arbitrary media content and to control display of the user selected arbitrary media content on the first display (44); at least one peripheral device configured to communicate the user selected arbitrary media content via the communications network, wherein the peripheral device is a connection unit (47), comprising: (a) a connector arranged to couple to a port of a processing device (31) having a second display, a memory and an operating system; and (b) a transmitter (62) arranged to communicate with the communications network, a program configured to be loaded onto the processing device (31) and to run on the operating system of the processing device, said program being arranged to obtain user selected arbitrary media content, said program leaving a zero footprint on termination, and an input device (48) enabling the user to carry out a user action that triggers transfer of said user selected arbitrary media content to said transmitter (62) through said port." The patent is similar to the prior art techniques described above in that when user ends simultaneously transmit images and picture files of large capacity and high resolution to a receiver (63) and the node or the display node (36), a large amount of network band width and image processing displaying resources must be used so that the overall facility cost is relatively high and installation cost become significantly expensive, thereby greatly reducing industrial use and economic value thereof. In addition, the structure of the tool is only applicable to situations of medium transmission and displaying for small-size meetings that have only a few participants and is not applicable to uses of multiple briefing information meeting or multimedia image advertisement, previews television walls having a number of participants, so that the use thereof is limited.

Further, the above US patent discloses, in FIG. 10, an embodiment of peripheral device. As described in Lines 12-43 of paragraph 25 of the specification of the patent, the connection unit (47) is a physical device in the form of a single connector as a plug-and-play interface of a user process device of a computer, such as USB connection, for connecting to movable data and power connection of host device, connector and base, the base having an actuator, such as a button, the button being arranged to include an input device (48) having the above function. However, such an independent peripheral device, due to being coupled to multiple devices and functions, such as a transmitter (62) in the form of a wireless WIFI transmission interface, a portable mass storage, a visual indicator, an actuator, an input device, data and power connection to provide an effect of the host device connecting with power and data transmission. Thus, in view of the independent and portable physical connection unit (47) must transmit high capacity medium data and uses more wireless data transmission band width and must consumer more power, and must be used in user-end host devices that have high power supply functions and making it adverse for the independent connection unit (47) to be used in a wider scope of application. For example, the independent connection unit (47) cannot be used in smart phone or tablet computer that has only limited power supply.

In addition, U.S. Pat. No. 9,083,768 discloses "electronic tool and methods for meetings" and U.S. Pat. No. 9,722,986 discloses "electronic tool and methods for meetings", both providing similar techniques and suffering the same problems of the prior art described in that a large amount of network band width and image displaying processing resources must be used, so that the overall facility cost is relatively high and installation cost become significantly expensive, thereby greatly reducing industrial use and economic value thereof. In addition, the structure of the tool is only applicable to situations of medium transmission and displaying for small-size meetings that have only a few participants.

Chinese Patent Publication No. CN206759492U discloses a wireless routing device for automatic uploading of pictures based on 3G/4G, which teaches a technique that automatically uploads images taken by for example a digital camera according to IEEE1588 PTP. Similarly, the routing device of the Chinese patent only functions to forward, one by one, high capacity digital images taken by a digital camera to a remote cloud storage system, and must consume a large amount of wireless network band width, facility cost, and power, and does not provide other functions and uses, so that industrial use and economic value are low.

SUMMARY OF THE INVENTION

The primary objective of the present invention is to provide a value-added remote display service wireless routing server device and method to eliminate the problems and drawbacks of the above-discussed prior art and known patent documents that transmission of image data occupies a large amount of band width, relatively high installation cost and network transmission resources are required, and applications are limited to application situations of medium transmission and displaying of small-sized meetings having a limited number of participants and monotonous function of automatic picture uploading to cloud storage systems, and applications are not available for situations including multiple briefing meeting or multimedia image advertisements, preview television walls, making it adverse for the industrial.

Thus, the present invention provides a value-added remote display service wireless routing server device, which comprises:

at least one user-end image medium transmission electronic device, wherein the single or multiple user-end image medium transmission electronic devices are operable to transmit at least one image data;

at least one value-added routing server, which is connected through wired or wireless local area network to and receives image data from the user-end image medium transmission electronic device, wherein the value-added routing server transmits, in advance according to network band width and capability of processing data contents, pre-displaying data and instruction associated with magnification or reduction resolution and designated displaying location for the image data transmitted from the user-end image medium transmission electronic device to the user-end image medium transmission electronic device, so that the user-end image medium transmission electronic device adjusts, according to the pre-displaying data and instruction, an image resolution level of the image data and the value-added routing server outputs at least one corresponding image display screen data;

at least one destination-end image medium display device, which is connected to the value-added routing server to receive the image display screen data outputted from the value-added routing server and to output for displaying the image display screen data; and at least one actuation device, which is provided with a plurality of actuateable operation buttons and is connected to the user-end image medium transmission electronic device, the actuation device being provided with a plurality of actuateable operation buttons, the actuation device being operable through pressing and actuating the actuateable operation buttons so that the user-end image medium transmission electronic device, upon being caused to receive a corresponding actuation control signal, submits a request instruction of magnification of image displaying and adjustment of designated image displaying location to the value-added routing server.

In the above value-added remote display service wireless routing server device according to the present invention, the user-end image medium transmission electronic device comprises an operation system of WINDOWS and is provided with at least one USB interface and wireless or wired Ethernet network transmission apparatus.

In the above value-added remote display service wireless routing server device according to the present invention, the user-end image medium transmission electronic device has at least one image data magnification or reduction processing output function.

In the above value-added remote display service wireless routing server device according to the present invention, the user-end image medium transmission electronic device comprises a notebook computer.

In the above value-added remote display service wireless routing server device according to the present invention, the user-end image medium transmission electronic device comprises a tablet computer.

In the above value-added remote display service wireless routing server device according to the present invention, the user-end image medium transmission electronic device is connectable, through the value-added routing server, to an external international internet.

In the above value-added remote display service wireless routing server device according to the present invention, the user-end image medium transmission electronic device and the value-added routing server has a connection relationship of belonging to the same local area network.

In the above value-added remote display service wireless routing server device according to the present invention, the user-end image medium transmission electronic device uses preset wireless or wired the network transmission device image transmission protocol to transmit magnification or reduction processing image protocol message and video/audio data to the value-added routing server.

In the above value-added remote display service wireless routing server device according to the present invention, the user-end image medium transmission electronic device is stored, in advance, in an interior thereof, at least one type of software having a function of transmitting a protocol message and video/audio data to the value-added routing server.

In the above value-added remote display service wireless routing server device according to the present invention, the user-end image medium transmission electronic device, according to the pre-displaying data and instruction associated with magnification or reduction of image resolution for the image data transmitted from the user-end image medium transmission electronic device provided in advance by the value-added routing server to carry out preprocessing image transmission resolution for magnification or reduction of the image resolution of the image data and then transmitted to the value-added routing server.

In the above value-added remote display service wireless routing server device according to the present invention, the user-end image medium transmission electronic device directly retrieves a displayed output image of a display of the user-end image medium transmission electronic device to serve as a reference of the image data for transmission to the value-added routing server.

In the above value-added remote display service wireless routing server device according to the present invention, the user-end image medium transmission electronic device directly retrieves a screen image data displayed and output by a software virtual display inside the user-end image medium transmission electronic device to serve as a reference of the image data for transmission to the value-added routing server.

In the above value-added remote display service wireless routing server device according to the present invention, the value-added routing server is operable, according to image data transmission protocol with respect to the user-end image medium transmission electronic device, in an advertisement displaying mode to receive the image data transmitted from the multiple different user-end image medium transmission electronic devices or in a projection displaying mode to only receive the image data transmitted from the single user-end image medium transmission electronic device.

In the above value-added remote display service wireless routing server device according to the present invention, the value-added routing server receives the image data from the multiple user-end image medium transmission electronic devices and carries out automatic arrangement of display location of each image.

In the above value-added remote display service wireless routing server device according to the present invention, the value-added routing server comprises:

at least one router system unit, which is connected, through a wired or wireless local area network, to the user-end image medium transmission electronic device to acquire the image transmission protocol and the image data transmitted from the user-end image medium transmission electronic device and to transmit, in advance, the pre-displaying data and instruction associated with the magnification or reduction resolution and designated displaying location for the image data transmitted from the user-end image medium transmission electronic device to the user-end image medium transmission electronic device; and at least one remote display server unit, which is connected to the router system unit and the destination-end image medium display device to receive the image transmission protocol and the image data transmitted from the user-end image medium transmission electronic device and carry out processing and determine the displayed image resolution level and the arranged displaying location for the image data, and transmit, in advance, the pre-displaying data and instruction associated with the magnification or reduction resolution and designated displaying location for the image data transmitted from the user-end image medium transmission electronic device, through the router system unit, to the user-end image medium transmission electronic device for outputting at least one corresponding image display screen data to the destination-end image medium display device.

In the above value-added remote display service wireless routing server device according to the present invention, the router system unit of the value-added routing server comprises:

at least one LAN/WAN connection port, which is connected, through a wired network, to the user-end image medium transmission electronic device to couple to and receive the image transmission protocol and the image data transmitted from the user-end image medium transmission electronic device and to transmit, in advance, the pre-displaying data and instruction associated with the magnification or reduction resolution and designated displaying location for the image data transmitted from the user-end image medium transmission electronic device to the user-end image medium transmission electronic device;

at least one wireless network module, which is connected, through a wireless network, to the user-end image medium transmission electronic device to couple to and receive the image transmission protocol and the image data transmitted from the user-end image medium transmission electronic device and to transmit, in advance, the pre-displaying data and instruction associated with the magnification or reduction resolution and designated displaying location for the image data transmitted from the user-end image medium transmission electronic device to the user-end image medium transmission electronic device;

at least one network interface, which is connected to the LAN/WAN connection port, the wireless network module, and the remote display server unit to receive from the user-end image medium transmission electronic device to couple to and receive the image transmission protocol and the image data transmitted from the user-end image medium transmission electronic device and allowing the remote display server unit to transmit, through the network interface, the pre-displaying data and instruction associated with the magnification or reduction resolution and designated displaying location for the image data transmitted from the user-end image medium transmission electronic device to the LAN/WAN connection port and the wireless network module; and at least one routing server unit, which is connected to the network interface to couple to and receive, from the network interface, the image transmission protocol and the image data transmitted from the user-end image medium transmission electronic device.

In the above value-added remote display service wireless routing server device according to the present invention, the remote display server unit of the value-added routing server has a wireless image transmission function.

In the above value-added remote display service wireless routing server device according to the present invention, the destination-end image medium display device comprises a projection displaying apparatus.

In the above value-added remote display service wireless routing server device according to the present invention, the destination-end image medium display device comprises a notebook computer.

In the above value-added remote display service wireless routing server device according to the present invention, the destination-end image medium display device comprises a tablet computer.

In the above value-added remote display service wireless routing server device according to the present invention, the destination-end image medium display device comprises a smart mobile phone.

In the above value-added remote display service wireless routing server device according to the present invention, the destination-end image medium display device comprises a liquid crystal display having a wireless image receiving function.

In the above value-added remote display service wireless routing server device according to the present invention, the actuation device is provided with at least one USB interface connector for connection with the user-end image medium transmission electronic device.

In the above value-added remote display service wireless routing server device according to the present invention, the actuation device is provided with at least one wireless transmission interface for connection, in a wireless manner, with the user-end image medium transmission electronic device.

In the above value-added remote display service wireless routing server device according to the present invention, the actuation device comprises a smart mobile phone.

In the above value-added remote display service wireless routing server device according to the present invention, the actuation device comprises a tablet computer.

In the above value-added remote display service wireless routing server device according to the present invention, the actuateable operation buttons of the actuation device are formed of a virtual touch button screen of a smart mobile phone The present invention also provides a value-added remote display service wireless routing server method, which comprises the following steps:

(A) User-end image medium transmission electronic device searching connection-available value-added routing server, wherein at least one user-end image medium transmission electronic device searches, in a wired or wireless local area network, at least one connection-available value-added routing server;

(B) User-end image medium transmission electronic device making on-line connection with connection-available value-added routing server, wherein the at least one user-end image medium transmission electronic device of Step (A) identifies, through the wired or wireless local area network connection of Step (A), by way of the user-end image medium transmission electronic device, the at least one connection-available value-added routing server;

(C) Value-added routing server determining, in advance, image displaying resolution and displaying location for user-end image medium transmission electronic device, wherein the on-line connected value-added routing server of Step (B) transmits, in advance, according to network band width and capability of processing data contents, pre-displaying data and instruction associated with magnification or reduction resolution and a designated displaying location of the image data transmitted from the user-end image medium transmission electronic device to the user-end image medium transmission electronic device;

(D) User-end image medium transmission electronic device adjusting image resolution of image data, wherein the user-end image medium transmission electronic device of Step (C) adjusts a level of the image displaying resolution for the user-end image medium transmission electronic device according to the pre-displaying data and instruction of the value-added routing server;

(E) Value-added routing server transmitting transmission protocol to user-end image medium transmission electronic device, wherein the value-added routing server of Step (C) determines and assigns transmission protocol request including a displaying screen size, a local area address, a screen voice, a mouse cursor, and stop transmission that each of the user-end image medium transmission electronic devices should transmit according to an amount of displaying requests from all the user-end image medium transmission electronic devices of Step (D) to each of the user-end image medium transmission electronic device;

(F) User-end image medium transmission electronic device transmitting adjusted image displaying data to value-added routing server, wherein the user-end image medium transmission electronic devices of Step (E) transmits adjusted image data to the value-added routing server according to the transmission protocol that the value-added routing server transmits to each of the user-end image medium transmission electronic devices in Step (E);

(G) Value-added routing server transmitting image display screen data to at least one destination-end image medium display device for displaying, wherein the value-added routing server of Step (F) conducts automatic arrangement of the image displaying data that has been adjusted by and transmitted from each of the user-end image medium transmission electronic devices and outputs an image display screen data to at least one destination-end image medium display device for displaying;

(H) User-end image medium transmission electronic device transmitting displaying screen adjustment request or not, wherein the value-added routing server of Step (F) detects if the user-end image medium transmission electronic device transmits a full screen, multiple screens, and a message requesting screen shifting and if positive, then executing Step (H1), otherwise repeating Step (G); and (H1) Value-added routing server receiving displaying screen and adjustment processing, wherein the value-added routing server of Step (H) re-arranges the displayed screen according to the full screen, multiple screen, and screen shifting request message of the user-end image medium transmission electronic device and repeating Step (E), the actuateable operation buttons of the actuation device being formed of a virtual touch button screen of the smart mobile phone.

Further, in the above value-added remote display service wireless routing server method according to the present invention, the value-added routing server of Step (C) based on the network band width and the capability of processing data contents, which comprise, but not limited to, an amount of the user-end image medium transmission electronic device connected to the value-added routing server and an extreme capacity of the image data that the value-added routing server can handle.

In the above value-added remote display service wireless routing server method according to the present invention, the adjusted image data of the user-end image medium transmission electronic device is transmitted to the value-added routing server and the during the transmission of the image data of the user-end image medium transmission electronic device, an operation with compression or without compression is carried out on the image data according to network communication quality.

In the above value-added remote display service wireless routing server method according to the present invention, the user-end image medium transmission electronic device of Step (H) is connected with at least one actuation device that is provided with a plurality of actuateable operation buttons, so that a pressing and actuation operation of the actuateable operation buttons of the actuation device causes the user-end image medium transmission electronic device to transmit a full screen, multiple screens, and a message requesting shifting the screen to the value-added routing server.

The efficacy of the value-added remote display service wireless routing server device and method is that a user-end image medium transmission electronic device and a value-added routing server have, established therebetween, a connection relationship of the same wired or wireless local area network, and the value-added routing server determines, in advance according to the number of the user-end image medium transmission electronic devices connected to the value-added routing server and an extreme capacity of the routing server for processing image data, which respectively designate network band width and data processing capacity, an image resolution level and a displaying location of image data transmitted from each of the user-end image medium transmission electronic devices, so as to allow each of the user-end image medium transmission electronic devices, in transmission of the image data, to maintain transmission with the same band width without wasting and occupying a large amount of network band width and to greatly reduce facility expenditure and installation cost, and also to allow the present invention to be applicable to diversified applications of for example multiple-briefing meetings having a large number of participants, multimedia image advertisements, and preview television walls, to completely eliminate the problems and drawbacks of the above-discussed prior art and known patent documents that transmission of image data occupies a large amount of band width, relatively high installation cost and network transmission resources are required, and applications are limited to application situations of medium transmission and displaying of small-sized meetings having a limited number of participants and monotonous function of automatic picture uploading to cloud storage systems, and being not available for diversified applications. Further, the actuation device connected to the user-end image medium transmission electronic device is structured to consume a less amount of electrical power, allowing for wired or wireless connection with the user-end image medium transmission electronic device to allow a user to press down and actuate actuateable buttons for making the user-end image medium transmission electronic device to transmit a full screen, multiple screens, and a message requesting screen shifting to the value-added routing server so that the value-added routing server, in response to the request of the user, adjusts a displayed image resolution, full screen displaying, or adjusting a displaying location of the image data to thereby further enhance the scope of application and industrial use of the present invention.

BRIEF DESCRIPTION OF THE DRAWINGS

The present invention will be apparent to those skilled in the art by reading the following description of preferred embodiments thereof, with reference to the attached drawings, wherein.

DETAILED DESCRIPTION OF THE PREFERRED EMBODIMENTS

Figure 1:
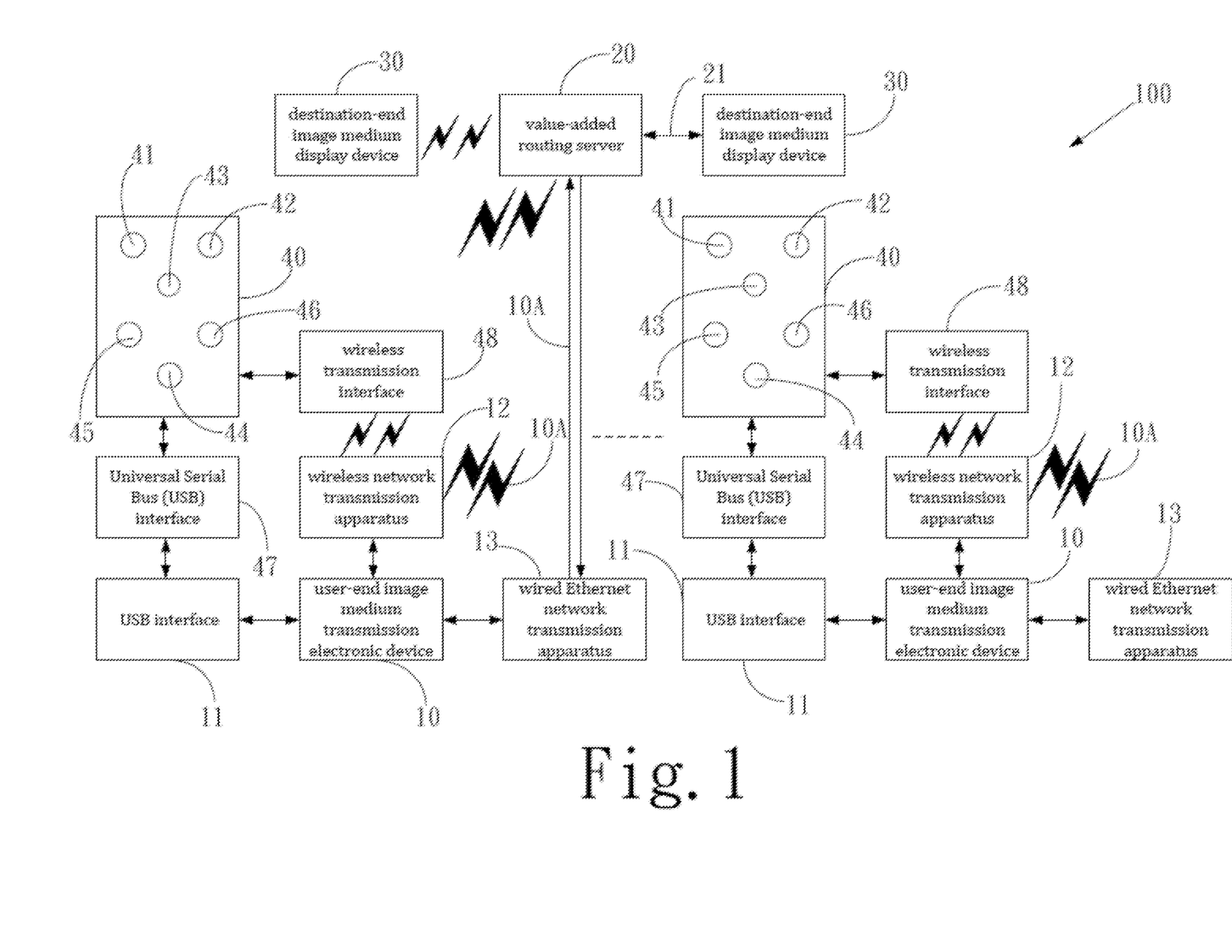
FIG. 1 is a system block diagram of a value-added remote display service wireless routing server device according to a first embodiment of the present invention.
Figure 2:
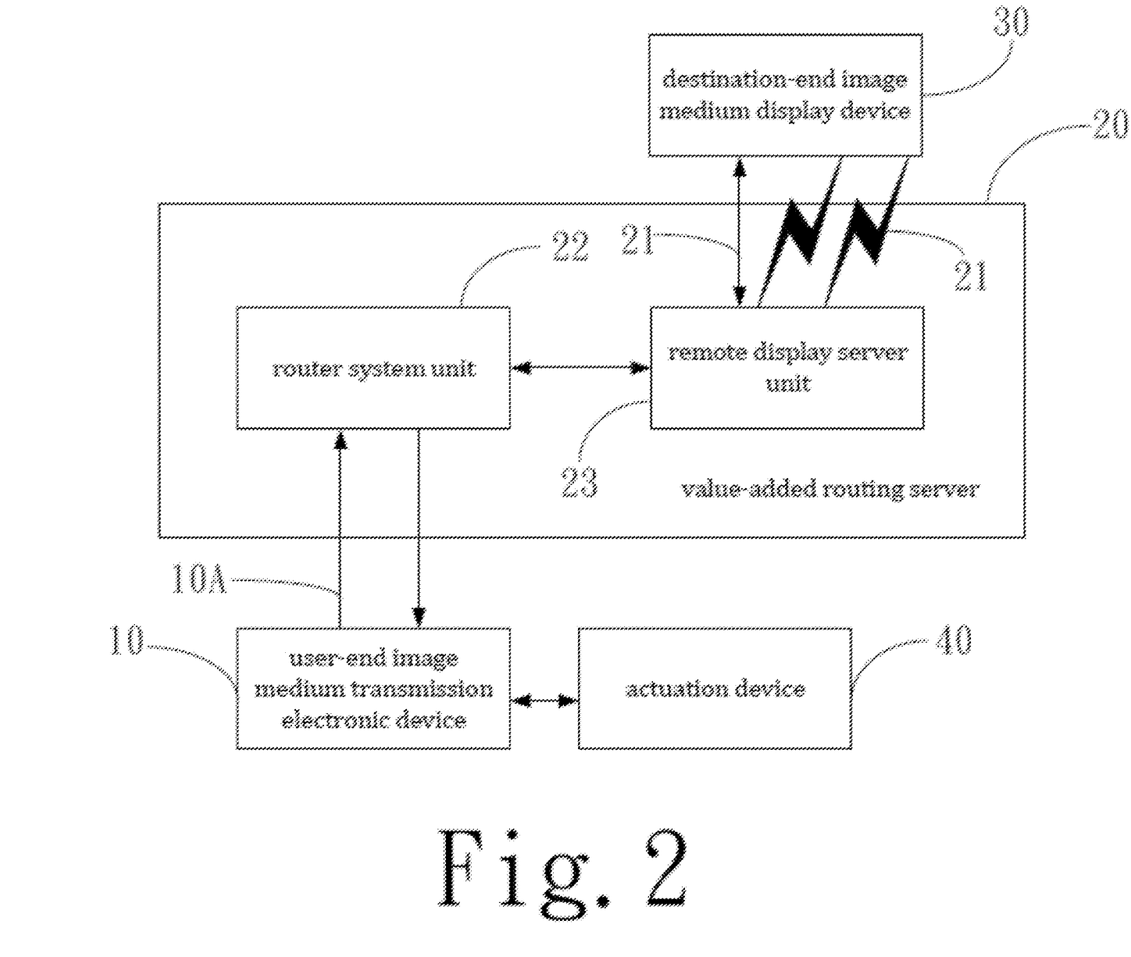
FIG. 2 is a block diagram of a value-added routing server of the value-added remote display service wireless routing server device according to the present invention.

Referring to FIGS. 1 and 2, a value-added remote display service wireless routing server device 100 according to a first embodiment of the present invention is shown. The device 100 comprises at least one user-end image medium transmission electronic device 10. The one or more user-end image medium transmission electronic devices 10 is configured to transmit at least one image data 10A. In other words, it is also feasible to have one single user-end image medium transmission electronic device 10 transmitting multiple image data 10A. The user-end image medium transmission electronic device 10 is provided with an operation system of WINDOWS, Android, or OS X of Apple company and has a resolution magnification or reduction processing output function for at least one image data 10A. The user-end image medium transmission electronic device 10 is provided with at least one USB interface 11, wireless network transmission apparatus 12, and wired Ethernet network transmission apparatus 13. The user-end image medium transmission electronic device 10 is not limited to any specific type, a notebook computer is taken as an example in this invention and other equivalent devices, such as tablet computers and smart mobile phones, are considered belonging to the scope of this invention.

At least one value-added routing server 20 is connected with a wired or wireless local area network for receiving the image data from the user-end image medium transmission electronic device 10. The user-end image medium transmission electronic device 10 and the value-added routing server 20 are of a connection relationship of belonging to the same local area network (LAN). The user-end image medium transmission electronic device 10 is connectable through the value-added routing server 20 to an external international Internet. The user-end image medium transmission electronic device 10 uses a preset wireless or wired network transmission device image transmission protocol to transmit a magnification or reduction processing image protocol message and the image data 10A to the value-added routing server 20; alternatively, the user-end image medium transmission electronic device 10 may user self-defined transmission protocol to transmit the magnification or reduction processing image protocol message and the image data 10A to the value-added routing server 20, so that the value-added routing server 20 may, based on network band width and capability of processing data contents, transmit, in advance, pre-displaying data and instruction associated with magnification or reduction resolution and designated displaying location for the image data transmitted from the user-end image medium transmission electronic device 10 to the user-end image medium transmission electronic device 10, to allow the user-end image medium transmission electronic device 10, based on the pre-displaying data and instruction, to adjust the image resolution level of the image data; the value-added routing server 20 also outputs at least one corresponding image display screen data 21. The user-end image medium transmission electronic device 10 stores, in advance, in the interior thereof, at least one form of software for the function of transmission of protocol message and video/audio data to the value-added routing server 20. The value-added routing server, when receiving the image data 10A of multiple user-end image medium transmission electronic devices 10, automatically carry out arrangement and edition of displaying locations of a displayed image of each of the image data 10A (such as sub-screens 210, 220, 230, 240, 250, 260, 270 and 280 of FIG. 4 or sub-screens 310, 320, 330, 340, 350, 360, 370 and 380 of FIG. 5).

The above-described user-end image medium transmission electronic device 10 may directly retrieve a displayed and output screen image of a display (not shown) of the user-end image medium transmission electronic device 10 to serve as a reference of the image data 10A transmitted to the value-added routing server 20, or alternatively, the user-end image medium transmission electronic device 10 first retrieves the screen image data displayed and outputted by a software virtual display (not shown) of the interior of the user-end image medium transmission electronic device 10 to serve as a reference of the image data 10A transmitted to the value-added routing server 20.

Figure 4:
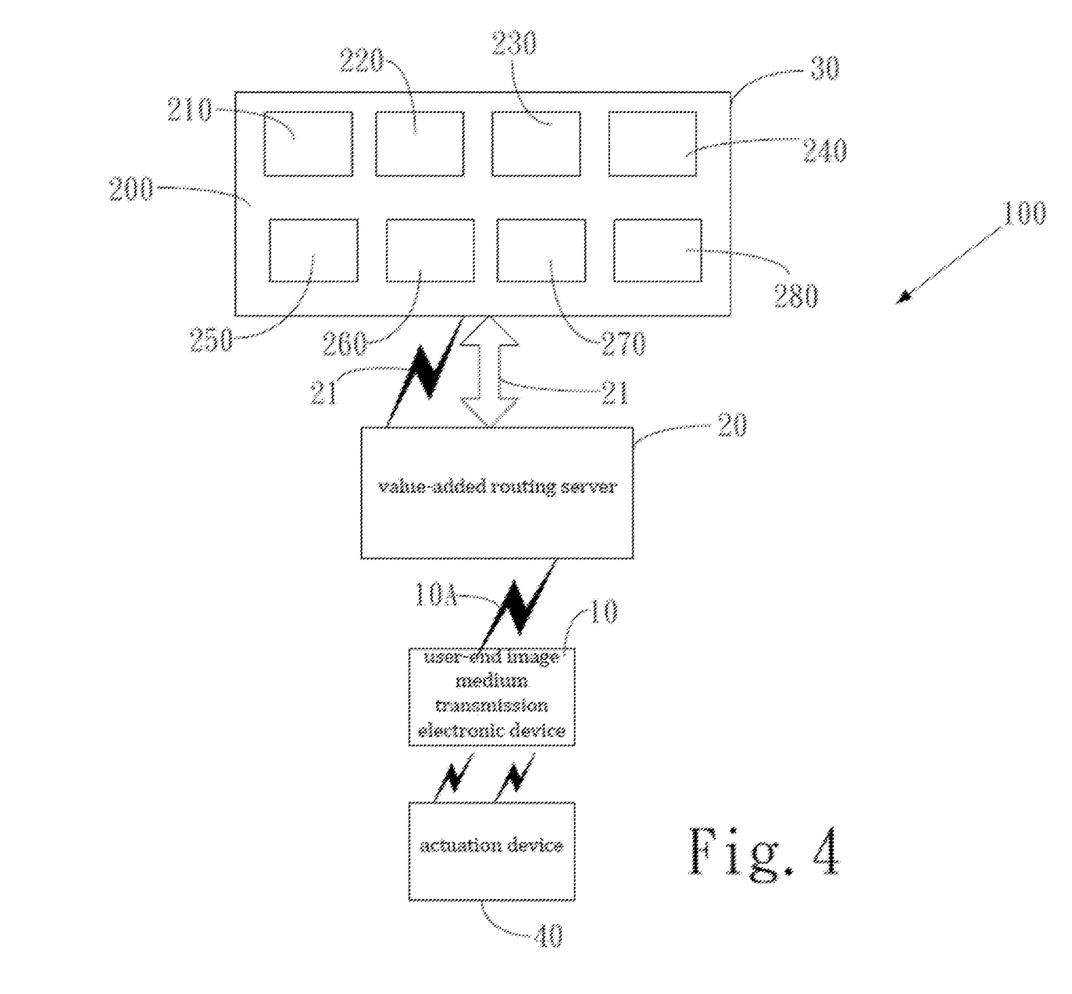
FIG. 4 is first application example of the value-added remote display service wireless routing server device according to the present invention.
Figure 5:
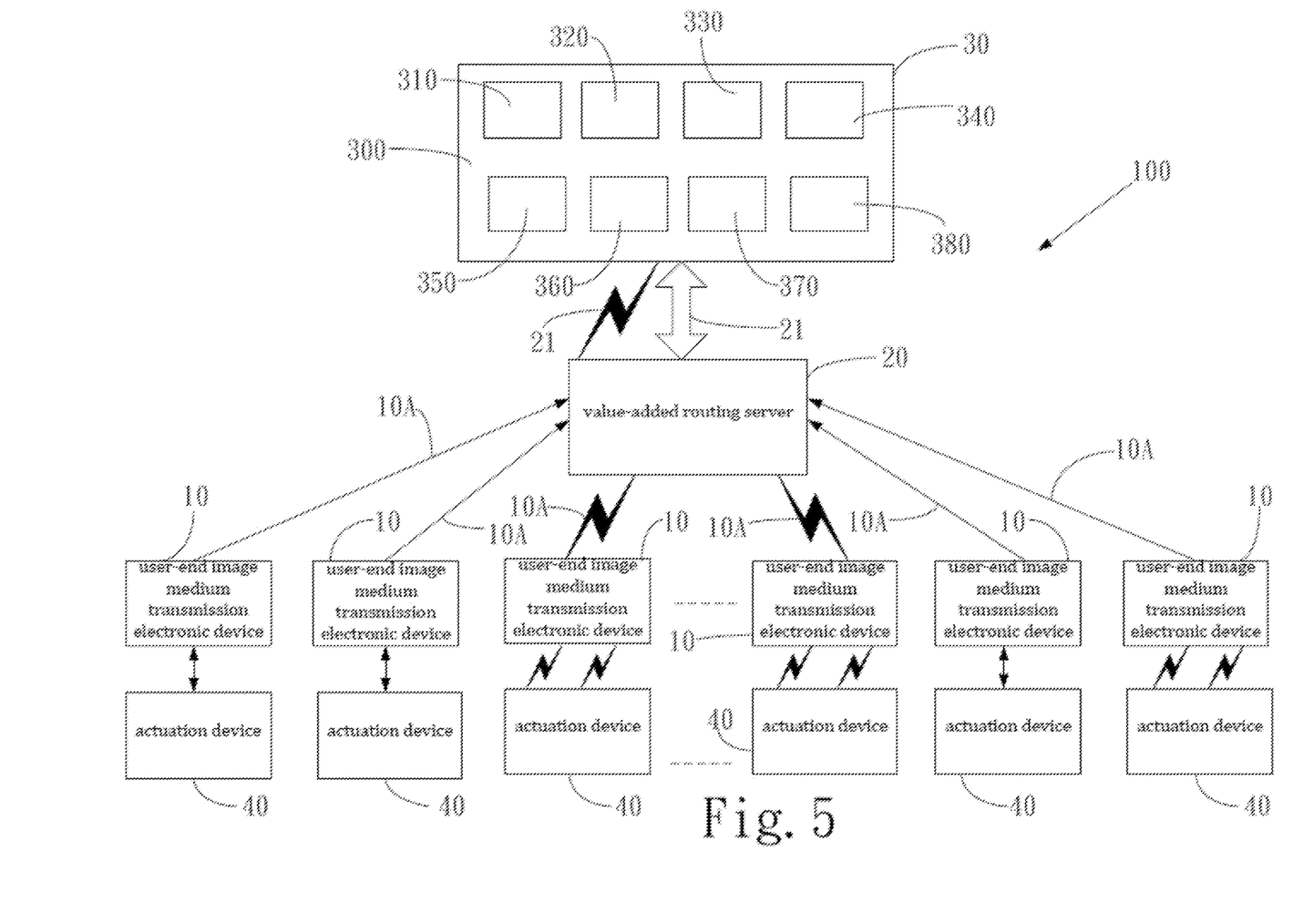
FIG. 5 is a second application example of the value-added remote display service wireless routing server device according to the present invention.

Based on the transmission protocol with respect to the user-end image medium transmission electronic device 10 for the image data 10A, the above-described value-added routing server 20 is operable in an advertisement displaying mode (as shown in FIGS. 1 and 5) for receiving the image data 10A transmitted from multiple different user-end image medium transmission electronic devices 10 or in a projection displaying mode (as shown in FIG. 4) for receiving the image data 10A transmitted from one single user-end image medium transmission electronic device 10.

The above-described value-added routing server 20 is not limited to any specific type and one that includes at least one router system unit 22 and at least one remote display server unit 23 is taken as an example in this invention, wherein the at least one router system unit 22 is connected, through a wired or wireless local area network, to the user-end image medium transmission electronic device 10 to acquire the image transmission protocol and the image data 10A transmitted from the user-end image medium transmission electronic device 10 and to transmit, in advance, the pre-displaying data and instruction of the magnification or reduction resolution and designated displaying location for the image data 10A of the user-end image medium transmission electronic device 10 to the user-end image medium transmission electronic device 10.

The remote display server unit 23 is connected with the router system unit 22 to receive and acquire the image transmission protocol and the image data 10A transmitted from the user-end image medium transmission electronic device 10 for processing and determining the displayed image resolution level and the arranged displaying location of the image data and transmit, in advance, the pre-displaying data and instruction of the magnification or reduction resolution and designated displaying location for the image data 10A transmitted from the user-end image medium transmission electronic device 10, through the router system unit, to the user-end image medium transmission electronic device 10, and outputs at least one corresponding image display screen data 21. The remote display server unit 23 also has a wireless image transmission function, such as the wireless HDMI image transmission function of wireless HDMI (High Definition Multimedia Interface) transmitters.

The at least one destination-end image medium display device 30 is connected, in a wired or wireless form, to the remote display server unit 23 of the value-added routing server 20 to receive the image display screen data 21 output from the remote display server unit 23 of the value-added routing server 20 for outputting and displaying the image display screen data 21. The destination-end image medium display device 30 is not limited to any specific type and the connection with the remote display server unit 23 of the value-added routing server 20 is not limited to any specific type. In this invention, a wireless projection displaying apparatus is taken as an example, which receives, through a wireless image transmission way, the image display screen data 21 and displays a screen of the image display screen data 21 output from the remote display server unit 23 of the value-added routing server 20. Other equivalent wired or wireless connection notebook computer, tablet computer, and smart mobile phone or multimedia image display device, such as liquid crystal display having wired or wireless image receiving function is considered belonging to the scope of the present invention.

At least one actuation device 40 is connected to the user-end image medium transmission electronic device 10 and comprises a plurality of actuateable operation buttons 41, 42, 43, 44, 45 and 46, respectively provided as a location adjustment key and a standalone magnification projection key for a displayed image and four direction keys respectively associated with upward, downward, leftward, and rightward image position adjusting corresponding to the image data 10A of the user-end image medium transmission electronic device 10 so that a user may press down and thus actuate the actuateable operation button 41, 42, 43, 44, 45, or 46 to have the user-end image medium transmission electronic device 10 receiving the corresponding actuation control signal and then supplying an instruction to the value-added routing server 20 requesting for magnification of displaying of an image or adjustment of a designated image displaying location, so that the value-added routing server 20 may make adjustment of a displayed image of the image display screen data 21 outputted to the destination-end image medium display device 30 (such as the sub-screens 210, 220, 230, 240, 250, 260, 270 and 280 shown in FIG. 4 or the sub-screens 310, 320, 330, 340, 350, 360, 370 and 380 shown in FIG. 5) for individually magnified and displayed or adjustment of the designated image displaying location. When the actuateable operation buttons 41, 42, 43, 44, 45, and 46 of the actuation device 40 connected to each of the user-end image medium transmission electronic devices 10 have been pressed down and actuated simultaneously, the value-added routing server 20 executes the instruction of magnification of image displaying and adjustment of designated image displaying location for the one of the user-end image medium transmission electronic devices 10 that submits the request earliest, while the other ones of the user-end image medium transmission electronic devices 10 would be responded with a temporary suspension of acceptance of transmission protocol alert message, until the execution of the request instruction of magnification of image displaying and adjustment of designated image displaying location for the one of the user-end image medium transmission electronic device 10 has been successfully completed, at which time, a response is made to indicate the condition of being available for accepting a request instruction of magnification of image displaying and adjustment of designated image displaying location for the other ones of the user-end image medium transmission electronic device 10.

Connection between the above-described actuation device 40 and the user-end image medium transmission electronic device 10 is not to any specific type and an example of this invention is that the actuation device 40 comprises a Universal Serial Bus (USB) interface 47, which is connected, in a wired manner, to the user-end image medium transmission electronic device 10, and the actuation device 40 is further provided with at least one wireless transmission interface 48 for connection, in a wireless manner, with the user-end image medium transmission electronic device 10, so that the actuation device 40 is not necessarily connected, in a wired manner, to the user-end image medium transmission electronic device 10, providing the actuation device 40 with flexibility of use and application. The actuation device 40 is not limited to such two types and the actuation device 40 can be in the form of a smart mobile phone so that wireless connection thereof with the user-end image medium transmission electronic device 10 can be made through for example Bluetooth or WiFi. Further, the actuateable operation buttons 41, 42, 43, 44, 45, and 46 can be formed of virtual pushbuttons (not shown) provided with an application program (APP) of the actuation device 40 in the form of a smart mobile phone, so that the user may use fingers to touch and operate the actuateable operation buttons 41, 42, 43, 44, 45, and 46, to similarly achieve the same actuation operation function as that described above for the actuation device 40.

Figure 3:
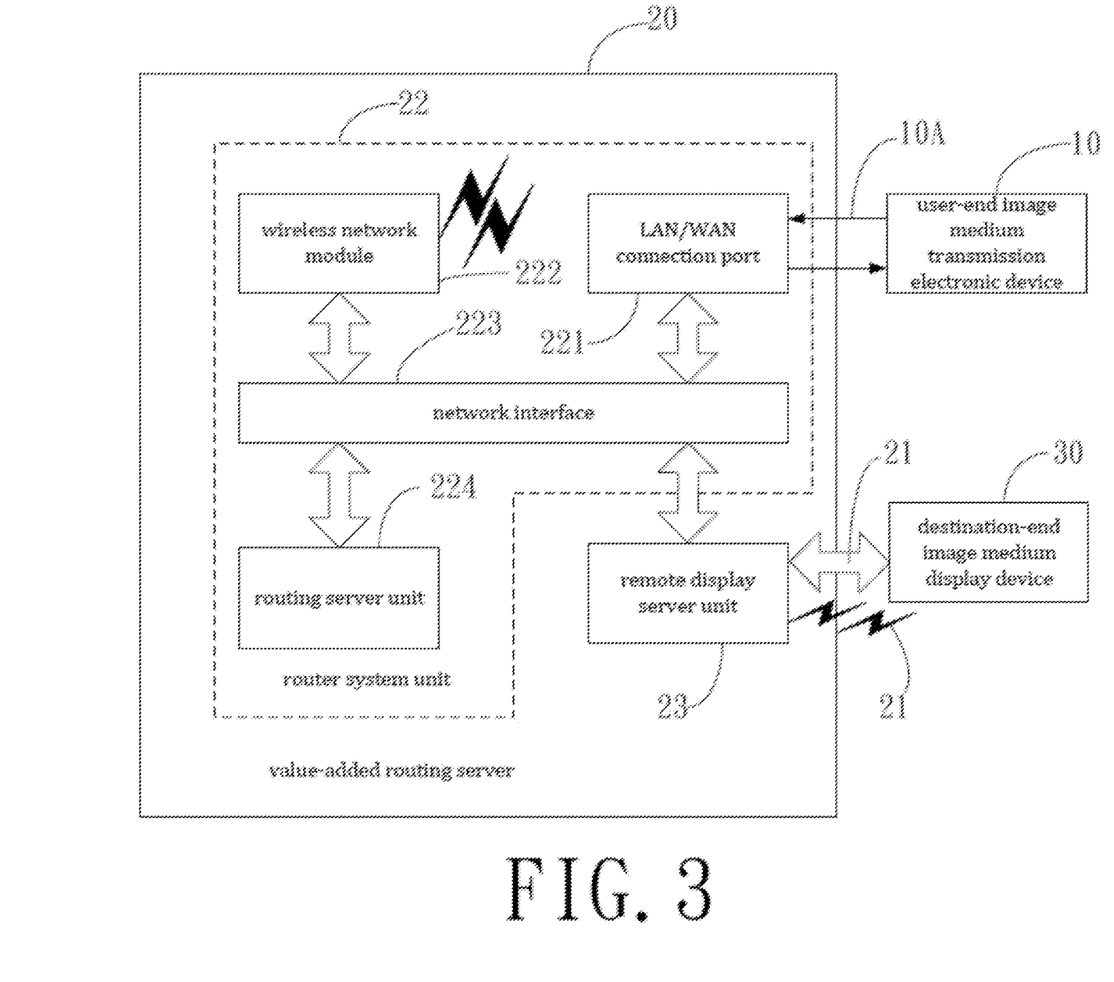
FIG. 3 is a value-added remote display service wireless routing server device according to a second embodiment of the present invention.

Referring to FIG. 3, a value-added remote display service wireless routing server device 100 according to a second embodiment of the present invention is shown, in which it is shown that the router system unit 22 of the value-added routing server 20 is structured to for example comprise at least one LAN/WAN connection port 221, at least one wireless network module 222, at least one network interface 223, and at least one routing server unit 224, wherein the LAN/WAN connection port 221 is arranged for connection, in a wired network manner, with the user-end image medium transmission electronic device 10 in order to couple to and receive an image transmission protocol and the image data 10A transmitted from the user-end image medium transmission electronic device 10 and to transmit, in advance, the pre-displaying data and instruction associated with the magnification or reduction resolution and designated displaying location for the image data 10A transmitted from the user-end image medium transmission electronic device 10 to the user-end image medium transmission electronic device 10.

The wireless network module 222 is connected, in a wireless network manner, to the user-end image medium transmission electronic device 10, in order to couple to and receive the image transmission protocol and the image data 10A transmitted from the user-end image medium transmission electronic device 10 and to transmit, in advance, the pre-displaying data and instruction associated with magnification or reduction resolution and designated displaying location of the image data 10A transmitted from the user-end image medium transmission electronic device 10 to the user-end image medium transmission electronic device 10.

The network interface 223 is connected to the LAN/WAN connection port 221, the wireless network module 222, and the remote display server unit 23, in order to couple to and receive the image transmission protocol and the image data 10A transmitted from the user-end image medium transmission electronic device 10 and allowing the remote display server unit 23 to transmit, in advance, through the network interface 223, the pre-displaying data and instruction associated with magnification or reduction resolution and designated displaying location of the image data 10A transmitted from the user-end image medium transmission electronic device 10 to the LAN/WAN connection port 221 and the wireless network module 222, and then forwarded through the LAN/WAN connection port 221 and the wireless network module 222 to the user-end image medium transmission electronic device 10.

The routing server unit 224 is connected to the network interface 222 to couple to and receive, from the network interface 222, the image transmission protocol and the image data 10A transmitted from the user-end image medium transmission electronic device 10.

Referring to FIG. 4, a first example of application of the value-added remote display service wireless routing server device 100 according to the present invention is illustrated, in which one single user-end image medium transmission electronic device 10 is shown, transmitting multiple image data 10A to the value-added routing server 20 in the projection displaying mode, meaning in a mode that the single user-end image medium transmission electronic device 10 transmits multiple image data 10A to the value-added routing server 20, the value-added routing server 20 is operable, according to network band width and the capability of processing data contents, to transmit, in advance, the pre-displaying data and instruction associated with magnification or reduction resolution and designated displaying location of the image data transmitted from the user-end image medium transmission electronic device 10 to the user-end image medium transmission electronic device 10, so that the user-end image medium transmission electronic device 10 may, accordingly, adjust, in advance, an image resolution level for each of the image data 10A, such as image reduction processing, and each of the image data 10A that has been subjected to resolution adjustment by the user-end image medium transmission electronic device 10 is then transmitted to the value-added routing server 20 to be subjected to automatic arrangement for displaying location of each of the image data 10A by the value-added routing server 20 to then output a corresponding image display screen data 21 to the destination-end image medium display device 30 for displaying and forming a destination screen 200. Here, each of the sub-screens 210, 220, 230, 240, 250, 260, 270 and 280 of the destination screen 200 corresponds to a corresponding displaying image of each of the image data 10A of the user-end image medium transmission electronic device 10 so that the destination screen 200 can be all sorts of advertisement preview images, meeting briefing images, or advertisement wall image forms, and the user may take action for pressing down and actuating the actuateable operation buttons 41-46 of the actuation device 40 to make the user-end image medium transmission electronic device 10 responding to the pressing-down and actuation condition of the actuateable operation buttons 41-46 to submit a request instruction of magnification of image displaying and adjustment of designated image displaying location to the value-added routing server 20, allowing the value-added routing server 20 to adjust each of the sub-screens 210-280 of the destination screen 200 for magnified displaying or displaying location adjustment. Such a projection mode of having the single user-end image medium transmission electronic device 10 transmit multiple image data 10A can be used indoors or outdoors for all sorts of projected or non-projected advertisement preview images, meeting briefing images, or advertisement wall image forms, and can be used in the destination screen 200 of public transportation, such as high-speed rail transportation, mass rapid transit, tour bus, or taxi for advertisement preview images or advertisement wall image displaying.

Referring to FIG. 5, a second example of application of the value-added remote display service wireless routing server device 100 according to the present invention is shown, in which multiple user-end image medium transmission electronic devices 10 transmit multiple image data 10A to the value-added routing server 20 in the advertisement displaying mode, meaning in a mode that the multiple user-end image medium transmission electronic devices 10 each transmit at least one image data 10A to the value-added routing server 20, the value-added routing server 20 is operable, according to network band width and the capability of processing data contents, to transmit, in advance, the pre-displaying data and instruction associated with magnification or reduction resolution and designated displaying location of the image data transmitted from the user-end image medium transmission electronic device 10 to the user-end image medium transmission electronic device 10, so that the user-end image medium transmission electronic device 10 may, accordingly, adjust, in advance, an image resolution level of each of the image data 10A, such as image reduction processing, and each of the image data 10A that has been subjected to resolution adjustment by the user-end image medium transmission electronic device 10 is then transmitted to the value-added routing server 20 to be subjected to automatic arrangement for displaying location of each of the image data 10A by the value-added routing server 20 to then output a corresponding image display screen data 21 to the destination-end image medium display device 30 for displaying and forming a destination screen 300. Here, each of the sub-screens 310, 320, 330, 340, 350, 360, 370 and 380 of the destination screen 300 corresponds to a corresponding displaying image of each of the image data 10A of the user-end image medium transmission electronic device 10 and can be any type of advertisement preview image, meeting briefing image, or advertisement wall image so that the user may take action for pressing down and actuating the actuateable operation buttons 41-46 of the actuation device 40 to make the user-end image medium transmission electronic device 10 responding to the pressing-down and actuation condition of the actuateable operation buttons 41-46 to submit a request instruction of magnification of image displaying and adjustment of designated image displaying location to the value-added routing server 20, allowing the value-added routing server 20 to adjust each of the sub-screens 310-380 of the destination screen 300 for magnified displaying or displaying location adjustment. Such a mode of having multiple user-end image medium transmission electronic devices 10 transmit multiple image data 10A can be used in all sorts of advertisement preview images, meeting briefing images, or advertisement wall images for a buyer and merchandise sale channels or malls to prompt the buying sides and selling sides within the same LAN or WLAN of the value-added routing server 20 to thereby increase efficiency of the buying side and the selling side for more effectively supplying of advertisement preview and enhance successful matching of transactions.

Figure 6:
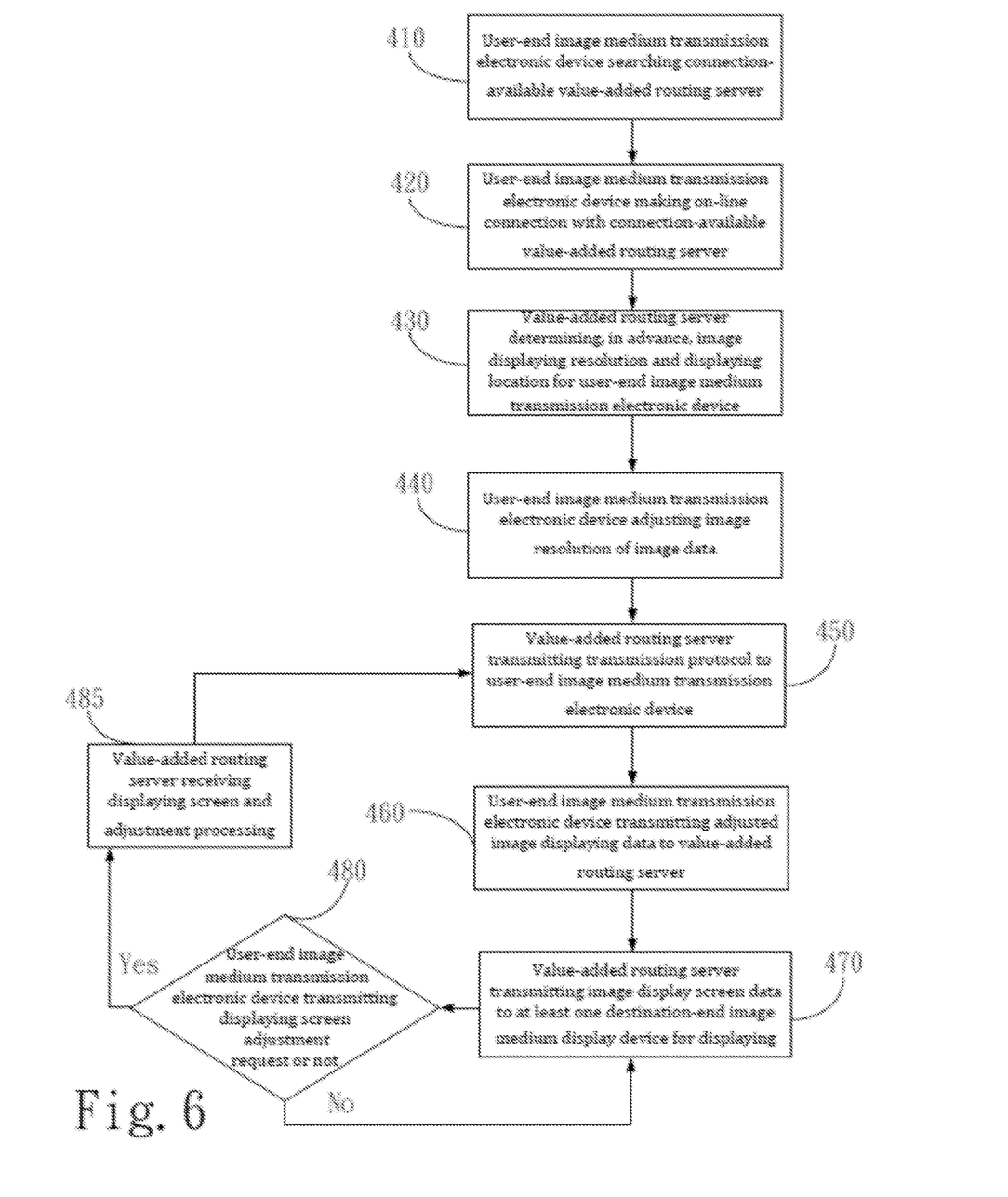
FIG. 6 is a flow chart illustrating a value-added remote display service wireless routing server method according to the present invention.

Referring to FIG. 6, a flow chart of a value-added remote display service wireless routing server method according to the present invention is shown, comprising the following steps, Step 410-485:

(410) User-end image medium transmission electronic device searching connection-available value-added routing server, wherein at least one user-end image medium transmission electronic device 10 searches, in a wired or wireless local area network, at least one connection-available value-added routing server 20;

(420) User-end image medium transmission electronic device making on-line connection with connection-available value-added routing server, wherein the at least one user-end image medium transmission electronic device 10 of Step (410) identifies, through the wired or wireless local area network connection of Step (410), by way of the user-end image medium transmission electronic device 10, the at least one connection-available value-added routing server 20;

(430) Value-added routing server determining, in advance, image displaying resolution and displaying location for user-end image medium transmission electronic device, wherein the on-line connected value-added routing server 20 of Step (420) transmits, in advance, according to network band width and capability of processing data contents, pre-displaying data and instruction associated with magnification or reduction resolution and a designated displaying location of the image data 10A transmitted from the user-end image medium transmission electronic device 10 to the user-end image medium transmission electronic device 10;

(440) User-end image medium transmission electronic device adjusting image resolution of image data, wherein the user-end image medium transmission electronic device 10 of Step (430) adjusts a level of the image displaying resolution for the user-end image medium transmission electronic device 10 according to the pre-displaying data and instruction of the value-added routing server 20;

(450) Value-added routing server transmitting transmission protocol to user-end image medium transmission electronic device, wherein the value-added routing server 20 of Step (430) determines and assigns transmission protocol request including a displaying screen size, a local area address, a screen voice, a mouse cursor, and stop transmission that each of the user-end image medium transmission electronic devices 10 should transmit according to an amount of displaying requests from all the user-end image medium transmission electronic devices 10 of Step (440) to each of the user-end image medium transmission electronic device 10;

(460) User-end image medium transmission electronic device transmitting adjusted image displaying data to value-added routing server, wherein the user-end image medium transmission electronic devices 10 of Step (450) transmits adjusted image data 10A to the value-added routing server 20 according to the transmission protocol that the value-added routing server 20 transmits to each of the user-end image medium transmission electronic devices 10 in Step (450);

(470) Value-added routing server transmitting image display screen data to at least one destination-end image medium display device for displaying, wherein the value-added routing server 20 of Step (460) conducts automatic arrangement of the image displaying data that has been adjusted by and transmitted from each of the user-end image medium transmission electronic devices 10 and outputs an image display screen data 21 to at least one destination-end image medium display device 30 for displaying;

(480) User-end image medium transmission electronic device transmitting displaying screen adjustment request or not, wherein the value-added routing server 20 of Step (460) detects if the user-end image medium transmission electronic device 10 transmits the entirety of an image screen, multiple screens, and screen shifting request messages and if positive, then executing Step (485), otherwise repeating Step (470); and (485) Value-added routing server receiving displaying screen and adjustment processing, wherein the value-added routing server 20 of Step (480) re-arranges the displayed screen according to the entirety of screen, multiple screen, and screen shifting request messages of the user-end image medium transmission electronic device 10 and repeating Step (450).

In the flow chart of the above-described value-added remote display service wireless routing server method according to the present invention illustrated in FIG. 6, including Step 400 to Step 485, can be installed, in advance, in the interior of the user-end image medium transmission electronic device 10 and the value-added routing server 20 by using control software mode or application program mode.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A value-added remote display service wireless routing server device, comprising:

at least one user-end image medium transmission electronic device operable to transmit at least one image data;

at least one value-added routing server connected through a wired or wireless local area network, the value-added routing server pre-configuring the image data to be received from the user-end image medium transmission electronic device, wherein the value-added routing server transmits pre-displaying data to the user-end image medium transmission electronic device in advance of receipt of the image data, the pre-displaying data including a pre-configuration instruction determined according to a band width of the local area network and according to a capability of processing data contents, the pre-configuration instruction indicating an increase or reduction in resolution of the image data and a designated displaying location on a display screen for the image data, such that the user-end image medium transmission electronic device preemptively adjusts an image displaying resolution level of the image data according to at least the pre-configuration instruction, the value-added routing server outputting at least one image display screen data based on the preemptively adjusted image data;

at least one destination-end image medium display device communicatively connected to the value-added routing server receiving and displaying the image display screen data outputted from the value-added routing server; and at least one actuation device having a plurality of actuateable operation buttons, the actuation device connected to the user-end image medium transmission electronic device, the actuation device being operable through pressing and actuating the actuateable operation buttons, such that the user-end image medium transmission electronic device, upon receiving an actuation control signal corresponding to one of the actuateable operation buttons, submits a request instruction of magnification of image displaying and adjustment of a designated image displaying location to the value-added routing server.

2. The value-added remote display service wireless routing server device according to claim 1, wherein the user-end image medium transmission electronic device comprises an operation system of WINDOWS and is provided with at least one USB interface and wireless or wired Ethernet network transmission apparatus.

3. The value-added remote display service wireless routing server device according to claim 1, wherein the user-end image medium transmission electronic device has at least one image data magnification or reduction processing output function.

4. The value-added remote display service wireless routing server device according to claim 1, wherein the user-end image medium transmission electronic device comprises a notebook computer.

5. The value-added remote display service wireless routing server device according to claim 1, wherein the user-end image medium transmission electronic device comprises a tablet computer.

6. The value-added remote display service wireless routing server device according to claim 1, wherein the user-end image medium transmission electronic device is connectable, through the value-added routing server, to an external international internet.

7. The value-added remote display service wireless routing server device according to claim 1, wherein the user-end image medium transmission electronic device and the value-added routing server are connected through the same local area network.

8. The value-added remote display service wireless routing server device according to claim 1, wherein the user-end image medium transmission electronic device uses preset wireless or wired network transmission device image transmission protocol to transmit a magnification or reduction processing image protocol message and video/audio data to the value-added routing server.

9. The value-added remote display service wireless routing server device according to claim 1, wherein the user-end image medium transmission electronic device, according to the pre-configuration instruction, carries out preprocessing image transmission resolution for magnification or reduction of the image resolution of the image data and then transmits the image data to the value-added routing server.

10. The value-added remote display service wireless routing server device according to claim 1, wherein the user-end image medium transmission electronic device directly retrieves a displayed output image of a display of the user-end image medium transmission electronic device to serve as a reference of the image data for transmission to the value-added routing server.

11. The value-added remote display service wireless routing server device according to claim 1, wherein the user-end image medium transmission electronic device directly retrieves a screen image data displayed and output by a software virtual display inside the user-end image medium transmission electronic device to serve as a reference of the image data for transmission to the value-added routing server.

12. The value-added remote display service wireless routing server device according to claim 1, wherein the value-added routing server is operable, according to an image data transmission protocol with respect to the user-end image medium transmission electronic device:

in an advertisement displaying mode, to receive image data transmitted from a plurality of user-end image medium transmission electronic devices, and in a projection displaying mode, to only receive the image data transmitted from a single user-end image medium transmission electronic device.

13. The value-added remote display service wireless routing server device according to claim 1, wherein the value-added routing server receives images from a plurality of user-end image medium transmission electronic devices and automatically arranges a display location of each image.

14. The value-added remote display service wireless routing server device according to claim 1, wherein the value-added routing server comprises:

at least one router system unit, which is connected, through the local area network, to the user-end image medium transmission electronic device to acquire the image transmission protocol and the image data transmitted from the user-end image medium transmission electronic device and to transmit, in advance of acquiring the image data, the pre-displaying data to the user-end image medium transmission electronic device; and at least one remote display server unit, which is connected to the router system unit and the destination-end image medium display device to receive the image transmission protocol and the image data transmitted from the user-end image medium transmission electronic device and carry out processing and determine the displayed image resolution level and the arranged displaying location for the image data, and transmit, in advance, the pre-displaying data through the router system unit to the user-end image medium transmission electronic device for outputting at least one corresponding image display screen data to the destination-end image medium display device.

15. The value-added remote display service wireless routing server device according to claim 14, wherein the router system unit of the value-added routing server comprises:
- at least one local area (LAN)/wide area network (WAN) connection port, which is connected, through a wired network, to the user-end image medium transmission electronic device to couple to and receive the image transmission protocol and the image data transmitted from the user-end image medium transmission electronic device and to transmit, in advance, the pre-displaying data to the user-end image medium transmission electronic device;
- at least one wireless network module, which is connected, through a wireless network, to the user-end image medium transmission electronic device to couple to and receive the image transmission protocol and the image data transmitted from the user-end image medium transmission electronic device and to transmit, in advance, the pre-displaying data to the user-end image medium transmission electronic device;
- at least one network interface, which is connected to the LAN/WAN connection port, the wireless network module, and the remote display server unit to receive from the user-end image medium transmission electronic device to couple to and receive the image transmission protocol and the image data transmitted from the user-end image medium transmission electronic device and allowing the remote display server unit to transmit, through the network interface, the pre-displaying data to the LAN/WAN connection port and the wireless network module; and
- at least one routing server unit, which is connected to the network interface to couple to and receive, from the network interface, the image transmission protocol and the image data transmitted from the user-end image medium transmission electronic device.

16. The value-added remote display service wireless routing server device according to claim 1, wherein the remote display server unit of the value-added routing server has a wireless image transmission function.

17. The value-added remote display service wireless routing server device according to claim 1, wherein the destination-end image medium display device comprises a projection displaying apparatus.

18. The value-added remote display service wireless routing server device according to claim 1, wherein the destination-end image medium display device comprises a notebook computer.

19. The value-added remote display service wireless routing server device according to claim 1, wherein the destination-end image medium display device comprises a tablet computer.

20. The value-added remote display service wireless routing server device according to claim 1, wherein the destination-end image medium display device comprises a smart mobile phone.

21. The value-added remote display service wireless routing server device according to claim 1, wherein the destination-end image medium display device comprises a liquid crystal display having a wireless image receiving function.

22. The value-added remote display service wireless routing server device according to claim 1, wherein the actuation device is provided with at least one Universal Serial Bus (USB) interface connector for connection with the user-end image medium transmission electronic device.

23. The value-added remote display service wireless routing server device according to claim 1, wherein the actuation device is provided with at least one wireless transmission interface for connection, in a wireless manner, with the user-end image medium transmission electronic device, the actuation device comprising at least one USB interface connector for connection with the user-end image medium transmission electronic device.

24. The value-added remote display service wireless routing server device according to claim 1, wherein the actuation device comprises a smart mobile phone.

25. The value-added remote display service wireless routing server device according to claim 1, wherein the actuation device comprises a tablet computer.

26. The value-added remote display service wireless routing server device according to claim 1, wherein the actuateable operation buttons of the actuation device are formed of a virtual touch button screen of a smart mobile phone.

27. A value-added remote display service wireless routing server method, comprising:
(A) by a user-end image medium transmission electronic device, searching for and identifying a connection-available value-added routing server in a wired or wireless local area network;
(B) by the user-end image medium transmission electronic device, making on-line connection with the identified value-added routing server;
(C) by the identified value-added routing server determining an image displaying resolution and a displaying location for the user-end image medium transmission electronic device according to a network band width and to a capability of processing data contents;
(C1) by the identified value-added routing server, transmitting pre-displaying data to the user-end image medium transmission electronic device, the pre-displaying data including a pre-configuration instruction indicating an increase or reduction in resolution and a designated displaying location of image data to be transmitted from the user-end image medium transmission electronic device;
(D) by the user-end image medium transmission electronic device, adjusting an image displaying resolution level of the image data according to at least the pre-configuration instruction of the value-added routing server;
(E) by the identified value-added routing server, transmitting a transmission protocol to the user-end image medium transmission electronic device, wherein the value-added routing server of determines and assigns a transmission protocol request including a displaying screen size, a local area address, a screen voice, a mouse cursor, and stop transmission that the user-end image medium transmission electronic device should transmit according to an amount of displaying requests from the user-end image medium transmission electronic device;
(F) by the user-end image medium transmission electronic device, transmitting preemptively adjusted image data to the value-added routing server according to the transmission protocol transmitted by the value-added routing server;

(G) by the identified value-added routing server, transmitting image display screen data to at least one destination-end image medium display device for displaying, wherein the value-added routing server of conducts automatic arrangement of the preemptively adjusted image data transmitted from each of the user-end image medium transmission electronic devices and outputs an image display screen data to at least one destination-end image medium display device for displaying; and (H) by the user-end image medium transmission electronic device, transmitting displaying screen adjustment request or not, wherein the value-added routing server of detects if the user-end image medium transmission electronic device transmits the entirety of an image screen, multiple screens, and screen shifting request messages, and:

if the detection is positive, by the identified value-added routing server, receiving displaying screen and adjustment processing, re-arranging the displayed screen according to the entirety of screen, multiple screen, and screen shifting request messages of the user-end image medium transmission electronic device and repeating operation (E), the actuateable operation buttons of the actuation device being formed of a virtual touch button screen of the smart mobile phone, and if the detection is negative, repeating operation (G).

28. The value-added remote display service wireless routing server method according to claim 27, wherein the capability of processing data contents is determined at least in part according to an amount of the user-end image medium transmission electronic device connected to the value-added routing server and an extreme capacity of the image data that the value-added routing server can handle.

29. The value-added remote display service wireless routing server method according to claim 27, wherein the user-end image medium transmission electronic device of is connected with at least one actuation device that is provided with a plurality of actuateable operation buttons, so that a pressing and actuation operation of the actuateable operation buttons of the actuation device causes the user-end image medium transmission electronic device to transmit an entire screen, multiple screens, and a message requesting shifting the screen to the value-added routing server.

* * * * *